(12) United States Patent
Kodama et al.

(10) Patent No.: US 6,878,439 B2
(45) Date of Patent: Apr. 12, 2005

(54) MAGNETIC RECORDING MEDIUM, ITS PRODUCTION PROCESS AND MAGNETIC RECORDING DEVICE

(75) Inventors: Hiroyoshi Kodama, Kawasaki (JP); Nobutaka Ihara, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 10/068,556

(22) Filed: Feb. 6, 2002

(65) Prior Publication Data

US 2002/0150795 A1 Oct. 17, 2002

(30) Foreign Application Priority Data

Feb. 8, 2001 (JP) .......................................... 2001-031772

(51) Int. Cl.⁷ ............................. G11B 5/66; G11B 5/70; B32B 15/00; B32B 3/02
(52) U.S. Cl. ..................... 428/336; 428/611; 428/668; 428/65.7; 428/694 TS; 428/694 TC; 428/900
(58) Field of Search ................. 428/694 TS, 336, 428/694 TC, 900, 611, 668, 65.7

(56) References Cited

U.S. PATENT DOCUMENTS

| | | | | |
|---|---|---|---|---|
| 5,721,033 A | * | 2/1998 | Teng et al. | 428/65.3 |
| 5,900,323 A | * | 5/1999 | Okamoto et al. | 428/611 |
| 6,180,202 B1 | * | 1/2001 | Lee | 428/65.3 |
| 6,461,750 B1 | * | 10/2002 | Chen et al. | 428/694 TM |
| 6,709,775 B1 | * | 3/2004 | Takahashi et al. | 428/694 TS |

FOREIGN PATENT DOCUMENTS

| EP | 001211674 A1 | * | 6/2002 |
| JP | 2001-052330 | * | 2/2001 |
| WO | WO 00/74042 A1 | * | 12/2000 |

* cited by examiner

Primary Examiner—Holly Rickman
(74) Attorney, Agent, or Firm—Greer, Burns & Crain, Ltd.

(57) ABSTRACT

A magnetic recording medium and a magnetic recording device using the same. The magnetic recording medium has a nonmagnetic substrate having applied thereon, through a crystal orientation-improving layer and a seed layer, a magnetic recording layer. The seed layer consists of a material having a higher surface energy than that of the crystal orientation-improving layer.

19 Claims, 6 Drawing Sheets

MAGNETIC RECORDING MEDIUM, ITS PRODUCTION PROCESS AND MAGNETIC RECORDING DEVICE

BACKGROUND OF THE INVENTION

1. Field of the Invention

The present invention relates to a magnetic recording medium and, more particularly, to a magnetic recording medium which can reduce noise and also increase a reproducing output along with an improvement in S/N ratio, and a production process for the magnetic recording medium. The present invention also relates to a magnetic recording device, typically, a magnetic disk device, for recording and reproducing information, using the magnetic recording medium of the present invention.

2. Description of Related Art

The development of information processing techniques has led to an increasing demand for an increase in the density of magnetic recording devices such as magnetic disk devices used in external storage devices for computers. Specifically, in the reproducing head of the magnetic disk devices, the use of a magnetoresistive head utilizing a magnetoresistor, wherein the electric resistance changes in response to the magnetic field intensity, that is, an MR head, instead of the conventional inductive thin film magnetic head has been proposed in the art. The MR head applies magnetoresistance, that is, the change in electric resistance produced in a magnetic material on application of an external magnetic field, to the reproduction of a signal on a recording medium and has features including a reproduction output margin that is several times larger than that of the conventional inductive thin film magnetic head, a low inductance and a large S/N ratio. Further, the use of an AMR (anisotropic magnetoresistive) head utilizing anisotropic magnetoresistance, a GMR (giant magnetoresistive) head utilizing giant magnetoresistance, and a spin valve GMR head of a practical type, besides the MR head, have also been proposed.

Further, in order to meet the demand for high density recording, a sufficient improvement in properties, to cope with the above MR head, AMR head, or GMR head (including spin valve head) has been demanded of the magnetic recording medium. In particular, in the magnetic recording medium, it is important to reduce the noise level, thus ensuring a high S/N ratio, because a reproducing output is reduced and at the same time the noise is increased to thereby cause a reduction of S/N ratio, when the recording density is increased.

Accordingly, in the prior art magnetic recording medium, there have been made a wide variety of attempts to obtain a high S/N ratio. Typical attempts include, for example, control in the crystal orientation of the underlayer, improvement in the crystal orientation of the magnetic recording layer, lattice matching of the underlayer with the magnetic recording layer, introduction of an interlayer and others.

Further, in the magnetic recording medium using an aluminum substrate, it is conventional to apply an amorphous NiP layer as a crystal orientation-improving layer over the aluminum substrate, because the NiP layer is effective to increase a crystal orientation of the Cr or Cr alloy underlayer to be directly deposited over the aluminum substrate as a function of the control of the composition of the NiP layer. This is because a nonorientation layer, i.e., an amorphous layer, becomes necessary in order to increase an in-plane orientation of the Co alloy such as CoCrPtTa constituting the magnetic recording layer.

The above reason will be further described. When an interlayer consisting of a Cr-based alloy is inserted between the aluminum substrate and the magnetic recording layer to increase an in-plane orientation of the Co alloy such as CoCrPtTa constituting the magnetic recording layer, it is necessary to orient the Cr-based alloy having a bcc (body-centered cubic) structure of the interlayer to Cr (200). To satisfy this requirement, it is essentially the premise that the underlayer such as NiP layer disposed just below the Cr-based alloy interlayer has an amorphous state.

When the Cr-based alloy is oriented in such a manner that a surface of the interlayer made of such alloy has a (200) plane, $2^{1/2}$ times the lattice spacing in the (200) plane can substantially conform with the lattice spacing in a c-axis direction of the magnetic recording layer such as CoCrPtTa having a hcp (hexagonal closest packing) structure, and, as a result, the magnetic recording layer can grow so that its c-axis extends in a horizontal direction and thus a (110) plane makes a main plane, thereby ensuring an in-plane orientation of the magnetic recording layer.

In addition to the application of the crystal orientation-improving layer described above, a remarkable reduction of the particle size of the crystals constituting the magnetic recording layer, i.e., formation of finely divided magnetic crystals, is also important to obtain an increased S/N ratio. In the prior art magnetic recording medium, to increase the S/N ratio of the medium, to control a composition of the alloy material constituting the magnetic recording layer, additional elements such as Ta or B have been added to the alloy material.

However, since the magnetic recording layer can be epitaxially grown while reflecting a crystal state of the underlying interlayer made of the Cr-based alloy, the above-described prior art methods for increasing an orientation of the magnetic crystals are unable to remarkably reduce the particle size of the crystals of the magnetic recording layer, and thus they cannot to ensure a sufficiently increased S/N ratio.

On the other hand, as is well-know in the art, the currently available magnetic recording medium has a reduced particle size in the order of about 10 nm in the magnetic crystals of the magnetic recording layer. Apparently, such a reduced particle size cannot be easily obtained by the above methods based on control of the composition of the magnetic layer or addition of the additional elements to the magnetic alloy. Namely these methods can apply to the production of the magnetic recording medium only when a remarkably reduced particle size of the magnetic crystals is not required.

SUMMARY OF THE INVENTION

The object of the present invention is to solve the many problems, described above, in the prior art magnetic recording media.

Therefore, an object of the present invention is to obtain finely and uniformly divided magnetic crystals which are effective to increase a S/N ratio of the magnetic recording medium, with a good reproducibility in the growth of the magnetic crystals.

Another object of the present invention is to provide a magnetic recording medium having a high reproducing output and a high S/N ratio as a result of the remarkably reduced noise.

Further, another object of the present invention is to provide a process for the production of the specific magnetic recording medium according to the present invention, with a good reproducibility.

Still another object of the present invention is to provide a magnetic recording device using the specific magnetic recording medium according to the present invention.

The above-described and other objects of the present invention will be easily understood from the following detailed description of the present invention.

In one aspect thereof, the present invention resides in a magnetic recording medium comprising a nonmagnetic substrate having applied thereon a magnetic recording layer, in which the substrate has, on an upper surface thereof, in sequence, a crystal orientation-improving layer and a seed layer consisting of a material having a higher surface energy than that of the crystal orientation-improving layer. In the magnetic recording medium, the nonmagnetic substrate is preferably a substrate of an aluminum-based alloy or a glass substrate.

In another aspect thereof, the present invention resides in a process for the production of a magnetic recording medium comprising a nonmagnetic substrate having applied thereon a magnetic recording medium, which comprises the steps of:

providing the nonmagnetic substrate;

depositing a crystal orientation-improving material onto the substrate to form a crystal orientation-improving layer;

depositing a seeding material having a higher surface energy than the crystal orientation-improving material on the crystal orientation-improving layer, with heating of the substrate, to form an island-like seed layer; and depositing the magnetic recording layer on the island-like seed layer.

In addition to the magnetic recording medium and its production process, according to the present invention, a magnetic recording device comprising a recording head section for recording in a magnetic recording medium and a reproducing head section for reproducing information, in which the magnetic recording medium in the magnetic recording medium according to the present invention is also provided. Typically, the magnetic recording device according to the present invention is a magnetic disk device using a magnetic disk as the magnetic recording medium.

The magnetoresistive head used in the magnetic disk device of the present invention preferably includes the MR head, the AMR head, the GMR head and the spin valve GMR head, because these heads can be operated with high performances. Further, the magnetoresistive head is preferably disposed on a stiction-free slider (SFS) which contains rails for creating a flying force wherein two or more projections or protrusions are disposed on a flying surface of the rails to prevent stiction. In other words, in the practice of the present invention, the magnetic recording medium of the present invention is preferably used in combination with the flying type magnetoresistive head provided with a slider containing stiction-preventing protrusions on a flying surface of the appended rails.

As will be appreciated from the following detailed description of the present invention, according to the present invention, as an underlayer consisting of a Cr-based alloy and a magnetic recording layer are formed in this order, through an island-like seed layer consisting of rhenium and the like having a higher surface energy of than the material of the underlying crystal orientation-improving layer, on the substrate, it becomes possible to finely divide crystal particles of the magnetic recording layer depending upon a distribution density of the island-like seed layer, thereby reducing a noise of the magnetic recording medium and at the same time, increasing a reproducing output and S/N ratio. Accordingly, the present invention can largely contribute on the provision of a highly increased recording capacity and recording density in the magnetic recording device such as magnetic disk and other hard disk devices.

DESCRIPTION OF THE PREFERRED EMBODIMENTS

The present invention will be further described with reference to preferred embodiments thereof.

The magnetic recording medium according to the present invention comprises a nonmagnetic substrate and a magnetic recording layer of a magnetic metal material applied through underlayers on the substrate, and may have a variety of layer structures within the range of the present invention.

Figure 1:
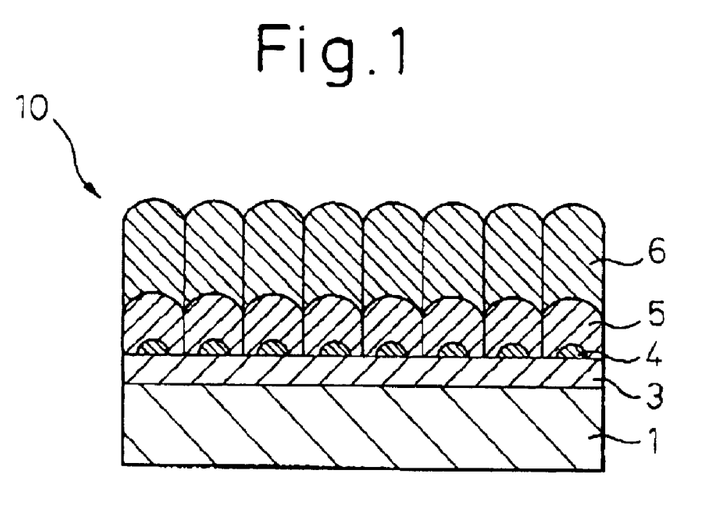
FIG. 1 is a cross sectional view of the magnetic recording medium according to one preferred embodiment of the present invention.

One preferred embodiment of the magnetic recording medium of the present invention is illustrated in FIG. 1 in which a magnetic recording medium 10 is so constituted that a magnetic recording layer 6 of a magnetic metal material is disposed through a crystal orientation-improving layer 3, an island-like seed layer 4 and an underlayer 5 consisting preferably of a Cr-based alloy, over a nonmagnetic substrate 1. The nonmagnetic substrate 1 is preferably made of an aluminum-based alloy or glass. Note, however, that the illustrated recording medium has the simplest structure, and it may have additional layers as in the conventional recording media, because practically used recording media have complicated layer structures.

The seed layer 4 is made of a seeding material having a higher surface energy than that of the crystal orientation-improving layer 3, and the seed layer 4 generally has a thickness of not more than 2 nm, when the thickness is determined assuming that the seed layer has a continuous thickness.

Preferably, the seed layer 4 is formed as an island-like film consisting of islandwise distributed and deposited seeding material. The seeding material used herein is not restrictive, and preferably rhenium (Re) or an alloy thereof. Of course, if it has the desired higher surface energy satisfying the requirements of the present invention, the seeding material may be any metal other than Re, and it may be used alone or as an alloy.

The crystal orientation-improving layer 3 used below and in combination with the seed layer 4 may be formed any material conventionally used as an underlayer in the magnetic recording medium, and preferably it is made from a phosphorus(P)-containing alloy such as NiP or CrP.

Further, the magnetic recording medium 10 has an underlayer 5 consisting of a chromium(Cr)-based alloy between the seed layer 4 and the magnetic recording layer 5.

In addition to these underlayers, although not shown, an adhesion-improving underlayer may be formed from chromium and others between the substrate 1 and the crystal orientation-improving layer 3.

The magnetic recording layer 5 may be formed from any magnetic alloy materials conventionally used in the magnetic recording media. Preferably, the magnetic layer contains cobalt as a principal component thereof and also contains, at least, chromium and platinum. More preferably, the CoCrP alloy may further contain tantalum or tantalum and niobium.

Further, although not illustrated in FIG. 1, a protective layer may be applied as an uppermost layer in the magnetic recording medium 10. The protective layer is preferably formed from carbon or diamond-like carbon (DLC), for example. The protective carbon layer may be further coated or impregrated with a lubricating material, typically a fluorine-based lubricant.

As described above, the seed layer is formed from a seeding material having a higher surface energy than the crystal orientation-improving material, and thus the seed layer is islandwise distributed and deposited as a function of a large surface tension of the seeding material. Then, the subsequent crystal growth is started from the island-like seed layer as a growth core. As a result, the crystal particles of the resulting magnetic recording layer can be controlled to have fine particles in conformity with the distribution density of the seed layer. Since the finely distributed crystals are formed in the magnetic layer, and increased output and S/N ratio can be obtained, in the magnetic recording medium, along with a reduction of the noise.

Moreover, in such a magnetic recording medium of the present invention, a thickness of the seed layer, as determined in terms of a continuous coating, is preferably not more than 2 nm, more preferably, not more than 1 nm. Since such a reduced thickness of the seed layer does not adversely affect on a magnetostatic property of the magnetic layer nor on a crystal orientation of the magnetic layer, a crystal orientation of the magnetic layer can be effectively controlled by the underlying crystal orientation-improving layer, along with a good maintenance thereof. The thickness of more than 2 nm should be avoided in the seed layer, because it can produce a completely continuous layer which can adversely affect on an epitaxial growth of the overlying layers, such as a Cr-based alloy underlayer and a magnetic layer, due to crystalinity (lattice length) of the seed layer.

In the formation of the seed layer, it is preferred that the seed layer is formed under heated conditions, preferably with heating of the substrate at a temperature of at least 150° C. Surprisingly, such heating is effective to further lower a particle size of the crystals of the magnetic layer grown through the Cr-based alloy underlayer.

The principal constitution and functions of the magnetic recording medium of the present invention will be appreciated from the above descriptions made referring to FIG. 1. The magnetic recording medium will be further described hereinafter for a clearer understanding of the present invention.

In the magnetic recording medium of the present invention, the nonmagnetic substrate used as a base body of the present invention is a glass substrate or an aluminum-based alloy substrate. The glass substrate may be suitably selected from the glass substrates which are conventional in the field of magnetic recording. Examples of suitable glass substrates include, but are not restricted to, a soda lime glass substrate, a non-alkali glass substrate, a crystallized glass substrate and the like. Similarly, the aluminum-based alloy substrate used herein may be a conventional. A suitable aluminum-based alloy is, for example, Al—Mg alloy. Of course, if necessary, an aluminum-based alloy substrate such as Al—Cu, Al—Si and others or any other substrate may be used in place of the Al—Mg alloy substrate.

Further, the substrate can be advantageously used after cleaning its surface. For example, a surface of the glass substrate may be cleaned in accordance with any conventional cleaning methods. As the cleaning method, a degreasing step using an extra pure water, alkaline washing agent or neutral cleaner or a washing step using a deionized water may be used alone or in combination. In addition to the above degreasing and cleaning steps, a surface of the substrate may be subjected to an activation treatment, if desired.

Preferably, the substrate is used in the form of a disk. The size of the disk is not restricted to the specific one, because it may be widely varied depending upon the details of the medium and the desired results.

In the magnetic recording medium of the present invention, the underlayer sandwiched between the nonmagnetic substrate and the magnetic recording layer is constituted from a first underlayer (also referred to as an "adhesion-improving underlayer") based preferably on chromium which may be omitted if desired, a second underlayer (crystal orientation-improving layer) consisting preferably of NiF or CrP which is applied directly or through the first underlayer to the substrate, and a third underlayer based preferably on chromium-based alloy.

The first underlayer is particularly applied to improve an adhesion of the second underlayer, i.e., the NiP or CrP layer, to the substrate. Therefore, if a satisfactory adhesion could be obtained in the absence of the first layer, the first layer may be omitted from the underlayer structure. However, the presence of the first underlayer is desirable, because it ensures highly improved and strong adhesion of the NiP or CrP layer to the substrate. Generally, the first underlayer may be formed from only chromium or, alternatively, it may be formed from an alloy of chromium and other metal(s), as is conventional in the field of magnetic recording. The alloy suitable for the formation of the first underlayer includes CrW, CrV, CrTi, CrMo and others.

The first underlayer is preferably formed in accordance with a sputtering method such as magnetron sputtering method under conventional sputtering conditions. Especially, to obtain a highly increased coercive force, it is preferred to carry out the sputtering process under the application of a negative DC bias. Suitable sputtering conditions include, for example, a temperature of about 100 to 300° C., argon (Ar) gas pressure of about 1 to 10 mTorr and negative DC bias of about 100 to 300V. If desired, in place of the sputtering method, other layer-forming methods such as vapor deposition and ion beam sputtering may be used. The layer thickness of the first underlayer may be widely varied depending upon the desired improvement of adhesion, and preferably it is in the range of about 5 to 25 nm.

The second underlayer as the crystal orientation-improving layer is preferably constituted from NiP or CrP. The NiP or CrP underlayer is preferably formed as a thin layer by sputtering. For example, since the thin underlayer can exactly reproduce the irregularities of the substrate surface, it can introduce the remarkable effects such as improvement in the travelling or running of the head and the adhesion of the head to the medium and generation of an anisotropy. Further, since it has a small surface roughness, the underlayer can introduce another effect such as reduction in the flying height of the head, when it is particularly used in combination with the magnetic head with protrusions.

The NiP or CrP underlayer is preferably formed in accordance with a sputtering method such as magnetron sputtering method under conventional sputtering conditions. Especially, to obtain a highly increased coercive force, it is preferred to carry out the sputtering process under the application of a negative DC bias. Suitable sputtering conditions include, for example, a temperature of about 100 to 250° C., argon (Ar) gas pressure of about 1 to 10 mTorr and negative DC bias of about 100 to 300V. During the formation of the underlayer, a crystallization of NiP or CrP can be prevented, because the sputtering process is carried out under a relatively low temperature of not more than 250° C. The layer thickness of the underlayer may be widely varied depending upon various factors, and preferably is in the range of about 5 to 100 nm in view of increase of a S/N ratio. A layer thickness below 5 nm will produce only insufficient magnetic characteristics, and a layer thickness above 100 nm will a tend to increase the noise.

If necessary, a texturing process may be applied to the second underlayer, preferably NiP or CrP underlayer, as the crystal orientation-improving layer. The texturing process on a surface of the second underlayer can be mechanically carried out by using any one of texturing methods which are conventional in the production of the magnetic recording medium. Suitable texturing process includes, for example, polishing of the underlayer surface with a polishing means such as a grinding tape or free abrasive grains.

After formation of the second underlayer (crystal orientation-improving layer), as described above and be described hereinafter, a seed layer is formed in a pattern of distributed islands.

Then, before forming a magnetic recording layer, a third underlayer is formed from chromium or, preferably, a chromium-based alloy. Typical examples of the chromium-based alloy include CrMo. When the magnetic recording layer contains platinum, it is particularly preferred that the third underlayer applied just below the magnetic recording layer is constituted from the metal material based on chromium and molybdenum. This is because the addition of molybdenum to chromium can widen the lattice spacing of the third underlayer so that the widened lattice spacing can approach the lattice spacing of the overlying magnetic recording layer (CoCrPt-based alloy) which is widened depending upon the composition of the magnetic recording layer, particularly the Pt content, thereby accelerating a preferential longitudinal orientation for the C-axis of the magnetic recording layer.

Of course, if desired, the third underlayer may be formed from a metal material based on chromium and metal(s) other than molybdenum. The metal material or alloy suitable for the formation of the third underlayer includes CrRu, CrW, CrV, CrTi and others.

The third underlayer is preferably formed in accordance with a sputtering method such as a magnetron sputtering method under conventional sputtering conditions. Especially, to obtain a highly increased coercive force, it is preferred to carry out the sputtering process under the application of a negative DC bias. Suitable sputtering conditions include, for example, a temperature of about 100 to 300° C., argon (Ar) gas pressure of about 1 to 10 mTorr and negative DC bias of about 100 to 300 V. If desired, in place of the sputtering method, other layer-forming methods such as vapor deposition and ion beam sputtering may be used. The layer thickness of the third underlayer may be widely varied depending upon various factors, however, to obtain an increased S/N ratio, it is preferred that the layer thickness of the third underlayer is in the range of about 5 to 60 nm. A layer thickness of less than 5 nm tends not to ensure satisfactory magnetic properties, and a layer thickness of more than 60 nm tends to increase the noise.

In the magnetic recording medium according to the present invention, the magnetic recording layer is formed from Co, a Co-based alloy such as CoPt and CoCrPt and others and is preferably constituted from a four-component or five-component metal alloy which contains cobalt as a principal component thereof, and also contains chromium and platinum in combination with tantalum and/or tantalum. Preferably, the Co-based alloy has a hcp structure and the CoPt alloy ensures a suitably high coercive force because of its uniaxial anisotropy.

In the magnetic recording layer of the magnetic recording medium, an amount of chromium and platinum used in combination with cobalt as the principal component is preferably as follows:

chromium about 14 to 22 at %, and platinum about 4 to 10 at %.

More particularly, when the magnetic recording layer is constituted from a four-component metal alloy of cobalt, chromium, platinum and tantalum, the layer should be preferably constituted so that it satisfies the following range of composition:

$$Co_{bal.}—Cr_{14-22}—Pt_{4-10}—Ta_x$$

in which bal. means a balance amount, and x is in the range of 1 to 5 at %.

Alternatively, when the magnetic recording layer is constituted from a five-component metal alloy of cobalt, chromium, platinum, tantalum and niobium, the layer should be preferably constituted so that it satisfies the following range of composition:

$$Co_{bal.}—Cr_{14-22}—Pt_{4-10}—Ta_x—Nb_y$$

in which bal. means a balance amount, and a sum of x and y (x+y) is in the range of 1 to 5 at %. The amount of the added tantalum and that of the added niobium in the five-component metal alloy are preferably the same or substantially the same.

In the magnetic recording medium of the present invention, the magnetic recording layer, regardless of its composition, i.e., four-component alloy or five-component alloy, preferably has a tBr value (product of a layer thickness t of the magnetic recording layer and its residual magnetic flux density Br) of 40 to 180 G. $\mu$m. The magnetic recording layer is particularly suitable for use in the magnetic recording medium designed to be used in combination with a MR head and other magnetoresistive heads, since it is characterized by being thinner in comparison with the prior art magnetic recording layers.

The magnetic recording layer formed through the above-specified underlayers on the nonmagnetic substrate is preferably formed from a CoCrPtTa alloy or CoCrPtTaNb alloy. The magnetic recording layer is preferably formed in accordance with a sputtering method under certain production conditions. Especially, to obtain a highly increased coercive force, it is preferred to carry out the sputtering process under the application of a negative DC bias. As in the above-described formation of the underlayers, the sputtering process may be advantageously carried out by using a magnetron sputtering method or other methods. Suitable sputtering conditions include, for example, a temperature of about 100 to 350° C., preferably about 200 to 320° C. and more preferably around about 250° C., argon (Ar) gas pressure of about 1 to 10 mTorr and negative DC bias of about 80 to 400 V.

In particular, in the magnetic recording medium of the present invention, it is preferred that all the underlayers and the magnetic recording layer, described above, are formed as a thin layer by sputtering. That is, according to the present invention, a resistance to shock of the substrate such as glass substrate can be maintained without deterioration, if all the layers are formed by sputtering, and a thickness of each layer is controlled to below the predetermined thickness by controlling the sputtering conditions. Suitable sputtering conditions were described above.

Preferably, the magnetic recording medium of the present invention may further comprise, as the outermost layer and usually on the above-described magnetic recording layer, a protective layer frequently adopted in the art. Suitable protective layers include, for example, a layer consisting of carbon alone and layers of carbon compounds, for example, C layer, WC layer, SiC layer, $B_4C$ layer, and hydrogen-containing carbon (C) layer. In particular, a protective layer of carbon or diamondlike carbon (DLC) can be advantageously used in the practice of the present invention. The DLC layer can exhibit a highly increased hardness. The above protective layer may be deposited by the conventional method, for example, by sputtering or chemical vapor deposition. The layer thickness of the protective layer may vary widely depending upon various factors. However, it is preferably about 5 to 15 nm.

In the magnetic recording medium of the present invention, in addition to the above-mentioned indispensable layers and optional layers, additional layers commonly used in the art may be included. Otherwise, the layers constituting the magnetic recording medium may be optionally subjected to chemical treatment or the like. For example, the protective layer may have thereon a lubricant layer comprising a fluorocarbon resin or otherwise may be subjected to treatment for imparting the same effect attained by the lubricant layer.

The magnetic recording medium of the present invention can be advantageously produced in accordance with the method described above. Typical production process of the magnetic recording medium according another preferred embodiment of the present invention will be described hereinbelow with reference to FIGS. 2A to 2D.

Figure 2A:
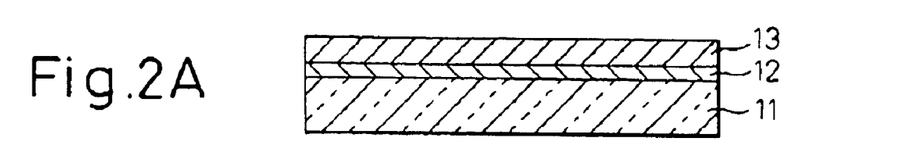
FIGS. 2A to 2D are cross sectional views showing, in sequence, the production of the magnetic recording medium according to another preferred embodiment of the present invention.

First, a single disk processing-type DC magnetron sputtering device designed for stop and oppose processing is provided. The sputtering device has several chambers each having a separating gate valve, and a vacuum of $3\times10^{-6}$ Pa can be applied to each chamber. After a glass substrate having a diameter of 2.5 inches (about 6.35 cm) was introduced in a processing chamber, underlayers are formed under the conditions of Ar gas pressure of 0.7 Pa. As shown in FIG. 2A, a 10 nm-thick Cr adhesion layer 12 and a 30 nm-thick NiP layer 13 made of $Ni_{81}P_{19}$ are deposited in this order on the glass substrate 11.

Then, the glass substrate 11 having the deposited NiP layer 13 is exposed to an atmosphere to cause an automatic oxidation in a surface of the NiP layer 13, thereby ensuring formation of an amorphous state surface in the NiP layer 13. The amorphous surface is effective to increase a (200) orientation of the Cr-based underlayer (CrMo underlayer) which will be described later.

Figure 2B:
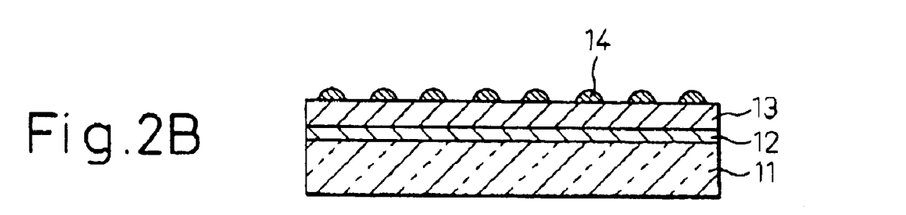

Thereafter, in the same DC magnetron sputtering device, rhenium (Re) is islandwise deposited on the NiP layer having an automatically oxidized coating. As shown in FIG. 2B, an island-like Re seed layer 14 is formed at a thickness in terms of a continuous coating of not more than 2 nm on the NiP layer 13. Note that the term "thickness in terms of a continuous coating" means a coverage of the sputtered seeding material necessary to obtain the described thickness (2 nm or less, in this instance), assuming that the resulting layer is not a island-like layer, but a continuous coating having a thickness of 2 nm or less.

The sputtering conditions for the formation of the island-like Re seed layer 14 is as follows: Ar gas pressure: 0.68 Pa; substrate temperature: not lower than 150° C.; deposition rate: 2 Å/sec; and deposition time: about 2 sec. The substrate temperatures applied are 150° C., 250° C. and 350° C.

In the Re sputtering process, as in the conventional sputtering of other metals, under the condition that the deposited Re layer has a very small thickness, Re was scatted and deposited as finely distributed crystal growing cores on the NiP layer 13, and the crystal growth was extended from the crystal growing cores. However, until the crystal growth is stopped at the level of ensuring the layer thickness of not more than 2 nm, the resulting island-like seed layer 14 showed discrete islands completely separated from each other.

Figure 2C:
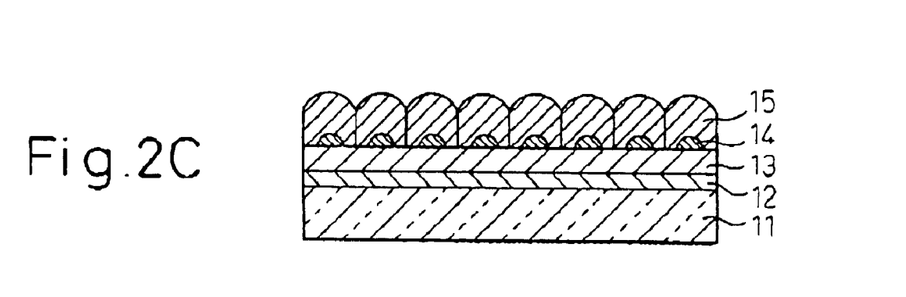

After formation of the island-like Re seed layer, the glass substrate is conveyed through a gate valve to the adjacent processing chamber. Then, the substrate temperature is increased to 220° C., and CrMo is deposited at a thickness of 10 nm. As shown in FIG. 2C, a CrMo underlayer 15 consisting of $Cr_{90}Mo_{10}$ is thus deposited as an uppermost layer on the glass substrate 11.

In this step, the CrMo underlayer 15 is epitaxially grown from the island-like Re seed layer 14 as a growing core. Thus, the resulting CrMo underlayer 15 can form a rod-shaped polycrystalline body having a size corresponding to the distribution density of the island-like Re seed layer 14. Further, a crystal orientation of the CrMo underlayer 15 can show a (200) orientation, because it is effected by the exposed NiP layer 13 between the island-like Re seed layer 14.

Figure 2D:
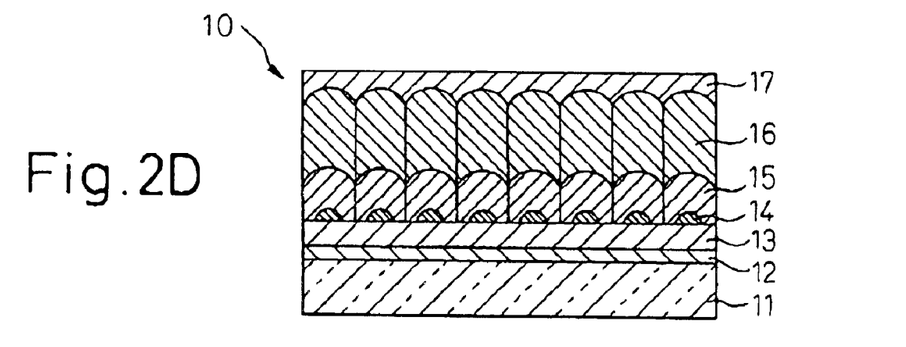

Thereafter, the glass substrate is conveyed through a gate valve to the adjacent processing chamber. Then, while the substrate temperature is maintained at 220° C., CoCrPtTa is deposited at a thickness of 20 nm. The maintenance of the substrate temperature at a certain level in the formation of the CrMo underlayer 15 and subsequent steps is necessary to prevent variation in the characteristics of the recording medium caused due to different segregation of the magnetic layer, i.e., CoCrPtTa layer. As shown in FIG. 2D, the CoCrPtTa layer 16 consisting of $Co_{69}Cr_{21}Pt_8Ta_2$ is thus deposited as an uppermost layer on the glass substrate 11.

In this instance, $Co_{69}Cr_{21}Pt_8Ta_2$ was deposited to form the magnetic recording layer 16. However, a comparable magnetic layer 16 can be deposited from the CoCrPtTa alloy having other compositions, CoCrPtTaNb alloy such as $Co_{74}Cr_{15}Pt_4Ta_4Nb_3$ and others, or CoCrPt alloy such as $Co_{76.3}Cr_{17}Pt_{6.7}$ and others. Further, if desired, the magnetic layer 16 may be deposited from Co alone or Co alloy containing at least Pt.

After formation of the CoCrPtTa layer 16, the glass substrate 11 is conveyed through a gate valve to the adjacent processing chamber in which, as shown in FIG. 2D, a carbon protective layer (DLC layer) 17 is deposited to a thickness of 5 nm.

Finally, although not illustrated, a fluorine-based lubricant is coated and dried on the DLC layer 17 to obtain a magnetic recording medium (magnetic disk) 10.

Figure 3:
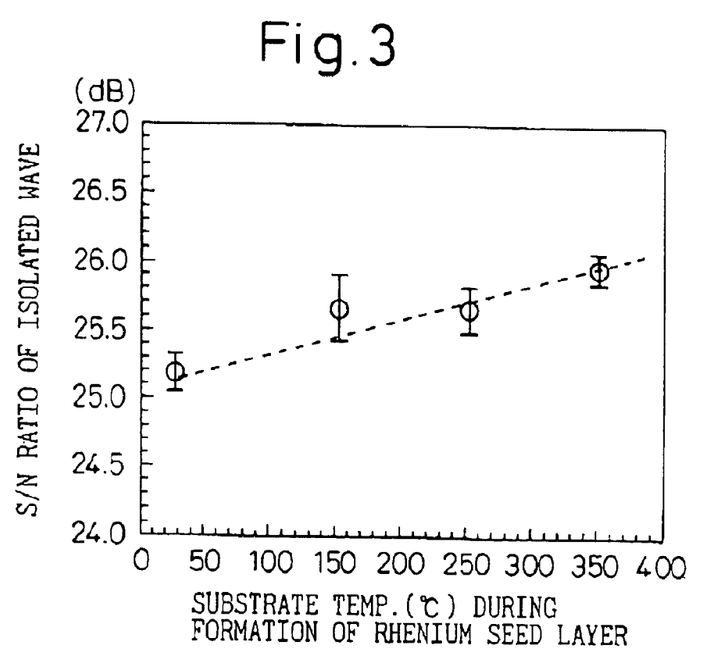
FIG. 3 is a graph showing a dependency of a S/N ratio of an isolated wave on a variation of the substrate temperature during formation of the island-like seed layer.
Figure 4:
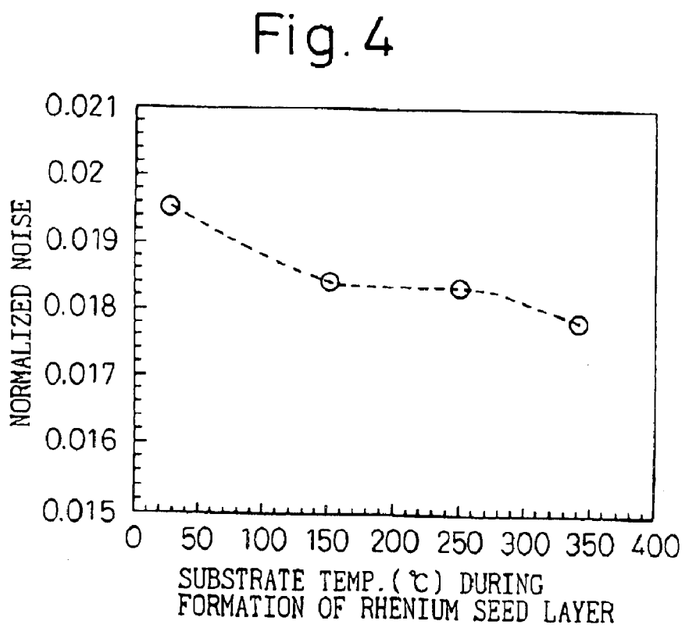
FIG. 4 is a graph showing a dependency of a normalized noise on a variation of the substrate temperature during formation of the island-like seed layer.
Figure 5:
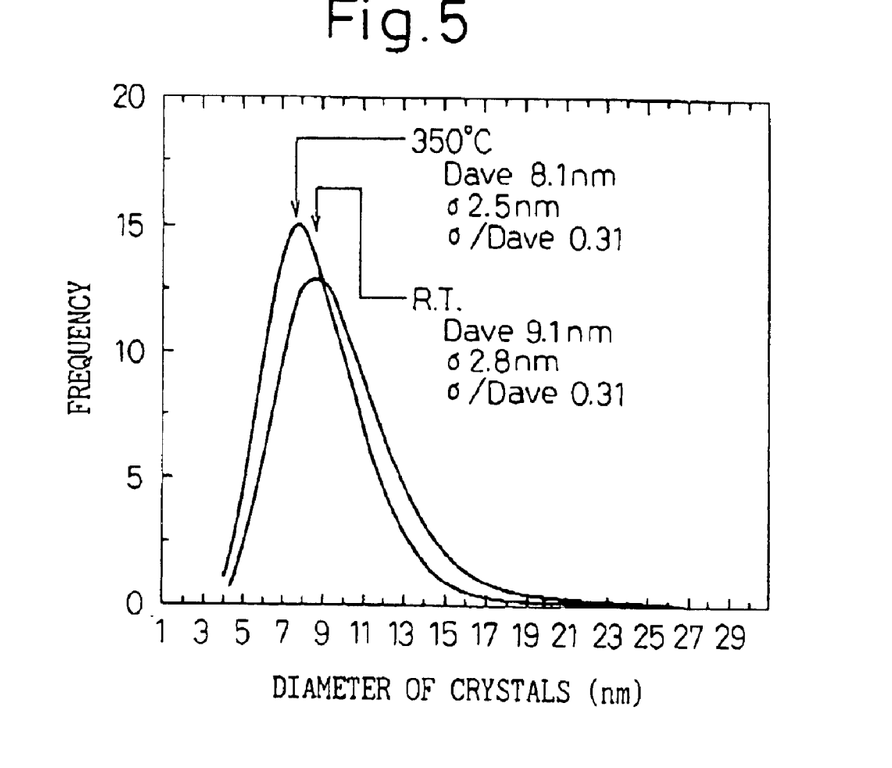
FIG. 5 is a graph showing a dependency of the distribution of the diameter (particle size) of the crystals in the magnetic recording layer during formation of the island-like seed layer.

The evaluation tests were made for the resulting magnetic disk to obtain the results plotted in FIGS. 3 to 5. Note in the evaluation tests that the substrate temperature was determined using a radiation thermometer, and no texturing was applied to the NiP layer.

FIG. 3 is a graph showing a dependency of a S/N ratio of the isolated wave on a variation of the substrate temperature during formation of the island-like Re seed layer. As is appreciated from this graph, the S/N ratio of the isolated wave is increased with an increase of the substrate temperature during the formation of the Re seed layer. An increase of about 0.8 dB in the S/N ratio can be obtained at 350° C., in comparison with room temperature.

FIG. 4 is a graph showing a dependency of a normalized noise on a variation of the substrate temperature during formation of the island-like seed layer. The "normalized noise", is defined as a quotient obtained by dividing a root mean square of the noise $(_\mu V_{rms})$ with an output of peak to peak $(_\mu V_{p-p})$ As is appreciated from this graph, the normalized noise is reduced with an increase of the substrate temperature during the formation of the Re seed layer. A reduction of about 10% in the normalized noise can be obtained at 350° C. in comparison with the room temperature.

From the results of FIGS. 3 and 4, it was considered that an increase of the S/N ratio of the isolated wave evidenced in FIG. 3 was introduced as a result of the reduction in the size of the crystal particle, i.e., formation of fine magnetic crystals, in the magnetic layer. Thus, the inventors took photographs of the magnetic crystals with a transmission electron microscope (TEM). The TEM photographs were used to calculate an average particle size of the magnetic crystals and obtain a graph protted in FIG. 5.

The graph of FIG. 5 shows a dependency of the distribution of the diameter (particle size) of the crystals in the magnetic recording layer during formation of the island-like seed layer. The magnetic crystals were grown at different substrate temperatures: room temperature (R.T.) and 350° C. As is observed from this graph, an average particle size of the magnetic crystals: Dave is 9.1 nm, a standard deviation: σ is 2.8 nm and thus σ/Dave is 0.31 at the room temperature, while Dave is 8.1 nm, σ is 2.5 nm and thus σ/Dave is 0.31 at 350° C. At the substrate temperature of 350° C., a reduction of about 1 nm was obtained in the average particle size of the magnetic crystals, in comparison with the room temperature.

The above results indicate that the function and effects of the island-like Re seed layer reside in the remarkable reduction of the particle size of the magnetic crystals in the magnetic layer, and such reduction of the particle size relies upon an epitaxial growth of the magnetic crystals which is carried out through the CrMo underlayer grown in the presence of the island-like Re seed layer as a growing core, and that an amount of the reduction of the particle size can be controlled by changing a substrate temperature during the formation of the Re seed layer.

Further, with regard to the formation of islands in the Re seed layer, it is considered that such islands were formed because a layer thickness in terms of the continuous coating was reduced in the RE seed layer. In addition to this reason, it is also considered that the formation of the island-like Re seed layer relies upon a surface tension, i.e., surface energy, of Re constituting the seed layer. The surface energy of Re is higher than that of the underlying NiP layer, and this is effective to form islands in the Re seed layer.

Namely, it is theoretically considered that when a second material to be grown has a higher surface energy than that of the underlying first material, the second material can be islandwise grown through its surface tension to the underlying first material.

For different metal materials, their surface energy and crystal structure are summarized in Table 1.

TABLE 1

| metal | surface energy ($10^{-3}$ N/m) | crystal structure |
| --- | --- | --- |
| Re | 3610 | hcp |
| W | 3343 | bcc |
| Os | 3327 | hcp |
| Mo | 2882 | bcc |
| Ir | 2855 | fcc |
| Ru | 2792 | hcp |
| Ta | 2773 | bcc |
| Rh | 2439 | fcc |
| Fe | 2379 | bcc |
| Nb | 2371 | bcc |
| Co | 2360 | hcp |
| Cr | 2139 | bcc |
| Ni | 2139 | fcc |
| Hf | 1991 | hcp |
| Ti | 1953 | hcp |

As is indicated in Table 1, Re has a surface energy of 3.61 N/m. With regard to the underlying NiP layer used as a crystal orientation-improving layer in the magnetic recording medium of the present invention, a surface energy of NiP could not be confirmed from the technical literature, however, since NiP used has a composition of $Ni_{81}P_{19}$, the surface energy of NiP is considered to be substantially the same as the surface energy (2.139 N/m) of Ni. Namely, the surface energy of Re is considered to be remarkably higher than that of NiP.

In this connection, it should be noted that the seeding material used in the formation of the seed layer is not restricted to Re, other metals such as W and the like may be used as the seeding material, because they have a higher surface energy than Ni.

Figure 6:
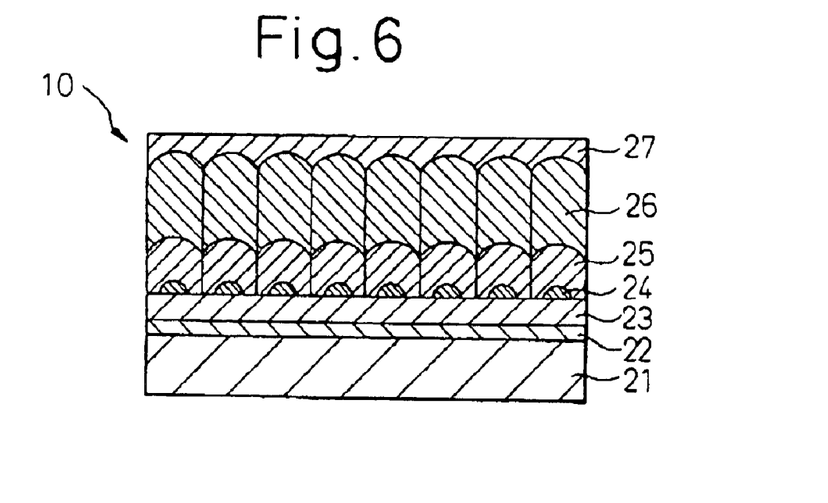
FIG. 6 is a cross-sectional view of the magnetic recording medium according to still another preferred embodiments of the present invention.

FIG. 6 is a cross-sectional view of the magnetic recording medium according to still another preferred embodiments of the present invention. The magnetic recording medium (magnetic disk) 10 has a layer structure similar to that of the magnetic disk 10 shown in FIG. 2D except that an Al—Mg alloy substrate 21 was used in place of the grass substrate 11 and, accordingly, the magnetic disk 10 can be produced in accordance with the method described above with reference to FIGS. 2A to 2D. It should be noted that, although not illustrated, the Al—Mg alloy substrate 21 also has the same layers 22 to 27 on an opposed surface (lower surface) thereof to form a duplicated magnetic disk.

For example, the magnetic disk 10 can be produced as follows.

An Al—Mg alloy substrate 21 consisting of $Al_{95}Mg_5$ (weight ration) and having a diameter of 3.5 inches (about 8.9 cm) is introduced in a single disk processing-type DC magnetron sputtering device, and a 10 nm-thick Cr adhesion layer 22 and a 30 nm-thick NiP layer 23 made of $Ni_{81}P_{19}$ are sputtered in this order on the Al—Mg alloy substrate 21.

Then, as in the manner described above referring to FIGS. 2B to 2D, an island-like Re seed layer 24, a CrMo underlayer 25, a magnetic layer 26 consisting of CoCrPtTa and a DLC protective layer 27 are deposited in this order. The DLC protective layer 27 is coated and dried to obtain the magnetic disk 10 of FIG. 6. Since the magnetic disk 10 has a diameter of 3.5 inches, it is appreciated that the present invention can be effectively applied to the production of large-sized magnetic disks.

According to a still another aspect thereof, the present invention resides in a magnetic recording device, using the magnetic recording medium of the present invention described above and described below in detail. The structure of the magnetic recording device of the present invention is not particularly limited. Preferably, the magnetic recording device is a magnetic disk device which comprises: a recording head section for recording information in a magnetic recording medium; and a reproducing head section for reproducing information. In particular, as will be described below, the reproducing head section is preferably provided with a magnetoresistive (MR) head using a magnetoresistor wherein the electric resistance changes in response to the magnetic field intensity.

In the magnetic recording disk device of the present invention, a composite magnetic head having the laminated structure in which a magnetoresistive reproducing head, for reading information from the magnetic recording medium, which comprises a magnetoresistor and a conductive layer for supplying a sense current into the magnetoresistor, and an induction type recording head, for recording information on the magnetic recording medium, which has a pair of thin film electrodes, are laminated, can be preferably used. Magnetoresistive reproducing heads usable herein may have various structures known in the art and suitable examples thereof include AMR (anisotropic magnetoresistive) heads utilizing anisotropic magnetoresistance and GMR (giant magnetoresistive) heads utilizing giant magnetoresistance (including spin valve GMR heads and the like).

Further, in the magnetic recording disk device of the present invention, it is preferred to dispose the magnetoresistive head on a stiction-free slider (SFS) which has rails for creating a flying force on a face, opposed to the magnetic recording medium, of the slider, and also has two or more projections or protrusions for preventing stiction on a flying face of the rails. More preferably, the disk medium used in combination with the head provided with the stiction-free slider has a surface roughness Ra in the range of 6 to 40 Å.

The SFS slider has two or more pad-like protrusions on a flying face thereof to prevent its stiction or adhesion on a surface of the disk medium. Any suitable slider structures may be adopted in the practice of the present invention, and one example of suitable slider structures can be found in Japanese Unexamined Patent Publication (Kokai) No. 61-48182. The floating-type magnetic head disclosed in this publication has at least three slider pads in the form of a semispherical protrusion on a face, opposed to a surface of the magnetic recording medium, of the head-supporting substrate, and at least one slider pad has an electromagnetic convertor. Using this floating-type magnetic head, it becomes possible to diminish a variation of the flying height of the head with regard to the direction of yaw angle because of presence of protrusions on the slider surface, thereby enabling the flying head to stably float without changing a flying position of the head, even if the yaw angle is increased to several tens of degrees. The flying-type magnetic head disclosed in Japanese Unexamined Patent Publication (Kokai) No. 61-151827 is also useful in the practice of the present invention. The flying-type magnetic head disclosed in this publication is characterized by disposing protrusions on an end portion (air inflow side) of the flying face of the slider, opposed to the magnetic recording medium, the height of the protrusions being larger than the surface roughness of the magnetic recording medium and being smaller than the flying height of the head. Using this flying-type magnetic head, it becomes possible to reduce a contact friction of the head against the magnetic recording medium as a function of the protrusions on the flying face of the slider, thereby enabling excellent flying and running of the head along with a large stability and a small flying height.

For the conventional magnetic heads, it was impossible to avoid an adhesion or stiction of the magnetic head to the magnetic recording medium, when a surface of the disk used has a roughness Ra of not more than 40 Å. Contrary to this, the magnetic head provided with the SFS slider can remove such a stiction problem. In fact, it has been found that even if the surface roughness Ra of the medium is reduced to 6 Å, no stiction is caused between the SFS slider-mounted head and the medium. Generally, the conventional lubricant layer applied on a surface of the magnetic recording medium can adversely affect on the prevention of the stiction, however, surprisingly, the inventors have found that, according to the present invention, stiction between the head and the medium can be effectively prevented even if the lubricant layer is applied at a substantial thickness of about 20 Å over the magnetic recording layer of the medium.

In addition to the above findings, the inventors have found that a flying characteristic of the head can be effectively controlled with the reduction of the surface roughness of the magnetic recording medium, because the flying characteristic can largely depend on the surface roughness of the medium. For the magnetic recording medium of the present invention, typical examples thereof, as described above, include those comprising a thin and sputtered NiP layer on a glass substrate, and the glass substrate with the sputtered NiP layer is particularly suitable for the texturing process to obtain a small surface roughness Ra. This is because the glass substrate has a higher hardness than the NiP layer and, therefore, due to difference in the hardness between the glass substrate and the NiP layer, texturing can be selectively applied to only a surface of the NiP layer. As an alternative method, if the substrate used is not harder than the glass substrate, a hard layer may be sandwiched between the substrate and the NiP layer.

Figure 7:
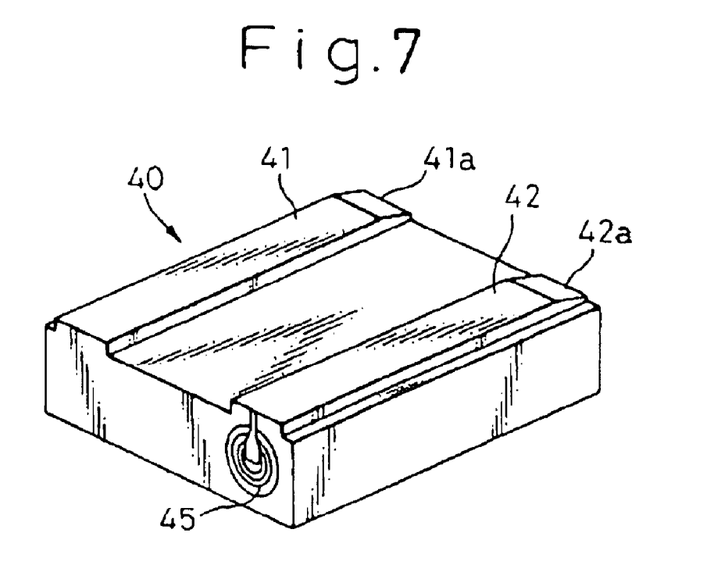
FIG. 7 is a perspective view illustrating one preferred embodiment of the slider with a magnetic head used in the magnetic recording device of the present invention.

The magnetic head of the magnetoresistive type can be produced by simultaneously forming a plurality of the magnetic heads on a head substrate of the ceramic material in accordance with the conventional thin layer formation methods, followed by cutting the head substrate to obtain discrete magnetic heads and then fabricating each head to obtain a desired shape. FIG. 7 is a perspective view of a slider provided with a magnetic head. In the slider shown in FIG. 7, rails 41 and 42 for creating a flying force are provided along the direction of an air stream created by the rotation of the magnetic recording medium (not shown) on the face, opposite to the magnetic recording medium, of the slider 40. Inclined faces 41a and 42a are formed on the air inflow side of the flying face of the rails 41 and 42, and the magnetic head 45 described above is provided on the rear end face of the rail 42 in the slider 40.

Although not illustrated in FIG. 7, when two or more protrusions are disposed on the predetermined sites of the flying face of the slider, it becomes possible to avoid contact of a surface of the magnetic disk with a whole of the flying face of the slider. That is, only the protrusions are concerned in the contact process. Because of remarkably reduced contact area between the disk and slider, a sliding friction of the magnetic head to a surface of the magnetic disk can be notatably reduced during flying process of the head, thereby enabling good running or operation of the head.

Figure 8:
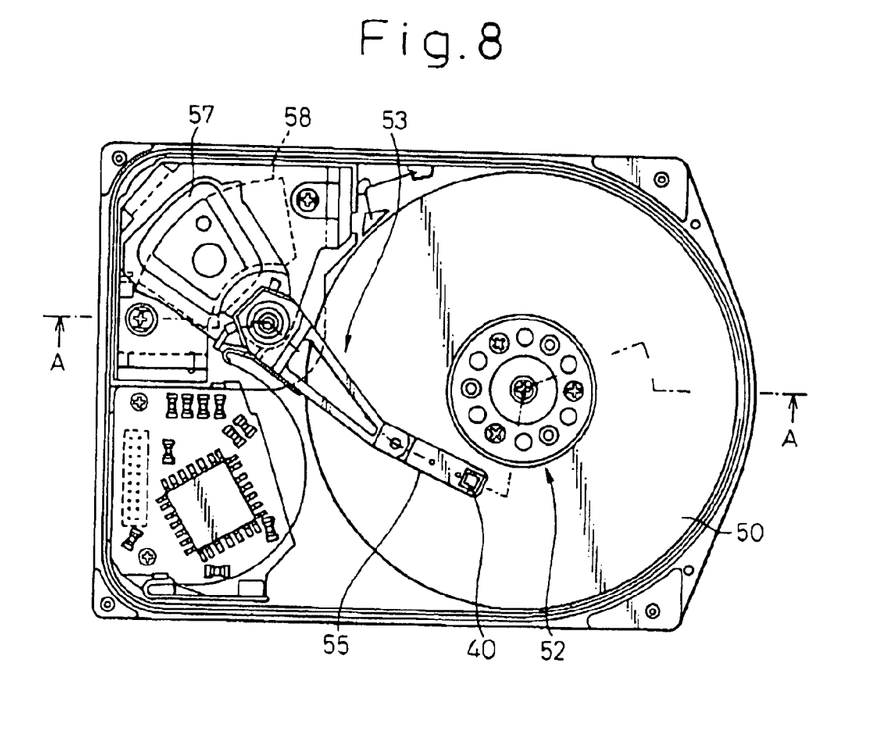
FIG. 8 is a plan view of the magnetic recording device according to one preferred embodiment of the present invention.
Figure 9:
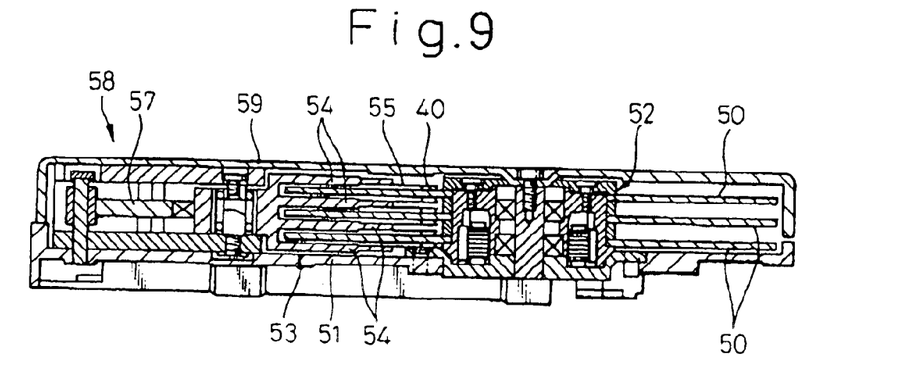
FIG. 9 is a cross-sectional view taken along line A—A of the magnetic recording device shown in FIG. 8.

Further, FIGS. 8 and 9 illustrate one preferred embodiment of the magnetic disk device according to the present invention. FIG. 8 is a plan view of the magnetic disk device from which a cover was removed for the sake of understanding the structure, and FIG. 9 is a cross-sectional view taken along line A—A of FIG. 8.

In these drawings, reference numeral 50 designates a plurality of magnetic disks (three disks are contained for the present embodiment) as a magnetic recording medium which is rotated and driven by means of a spindle motor 52 provided on a base plate 51.

Reference numeral 53 designates an actuator rotatably provided on the base plate 51. A plurality of head arms 54, which extend toward the recording face of the magnetic disk 50 are provided on one rotation end of the actuator 53. A spring arm 55 is rotatably mounted on the rotation end of the head arm 54, and, further, the above-described slider 40 is inclinably mounted through an insulating layer (not shown) on the flexure section of the spring arm 55. On the other hand, a coil 57 is provided on the other rotation end of the actuator 53.

A magnetic circuit 58 constituted by a magnet and a yoke is provided on the base plate 51, and the coil 57 is disposed within the magnetic gap of the magnetic circuit 58. The magnetic circuit 58 and the coil 57 constitute a moving coil type linear motor (VCM: voice coil motor). The upper surface of the base plate 51 is covered with a cover 59.

The operation of the magnetic disk device having the above constitution will be described. When the magnetic disk 50 is in a stopped state, the slider 40 is in contact with a siding zone and in a stopped state.

When the magnetic disk 50 is rotated and driven at a high speed by means of a spindle motor 52, an air stream created by the rotation of the magnetic disk 50 permits the slider 40 to fly above the disk face while leaving a very small space between the slider and the disk surface. In this state, application of a current to the coil 57 creates thrust in the coil 57, thus rotating the actuator 53. This permits the head (slider 40) to be moved to a desired track of the magnetic disk 50 to conduct reading/wiring of data In this magnetic disk device, the conductor layer in the magnetic head has a small thickness in the vicinity of the magnetoresistor section with the thickness of the other portion being large. This specific constitution reduces the curving of the magnetic pole of the recording head section and, at the same time, lowers the resistance of the conductor layer and, in the case of a small off-track error, enables information to be read with high accuracy and high sensitivity.

What is claimed is:

1. A magnetic recording medium comprising a nonmagnetic substrate having applied thereon a magnetic recording layer, in which said substrate has, on an upper surface thereof, in sequence, a crystal orientation-improving layer and a seed layer consisting of a material having a higher surface energy than that of the crystal orientation-improving layer, and said seed layer has a thickness of not more than 2 nm, when the thickness is determined assuming that the seed layer has a continuous thickness;

wherein said magnetic recording layer is constituted from a four-component metal alloy of cobalt, chromium, platinum and tantalum which is represented by the following formula:

in which bal. means a balance amount, and x is in the range of 1 to 5 at %.

2. A magnetic recording medium according to claim 1, in which said nonmagnetic substrate is a substrate of an aluminum-based alloy or a glass substrate.

3. A magnetic recording medium according to claim 1 or 2, in which said seed layer is an island-like film consisting of an islandwise distributed and deposited material having a higher surface energy than that of the crystal orientation-improving layer.

4. A magnetic recording medium comprising a nonmagnetic substrate having applied thereon a magnetic recording layer, in which said substrate has, on an upper surface thereof, in sequence, a crystal orientation-improving layer and a seed layer consisting of a material having a higher surface energy than that of the crystal orientation-improving layer, and said seed layer has a thickness of not more than 2 nm, when the thickness is determined assuming that the seed layer has a continuous thickness;

wherein said seed layer comprises rhenium.

5. A magnetic recording medium according to claim 1 or 2, in which said crystal orientation-improving layer comprises NiP or CrP.

6. A magnetic recording medium according to claim 1 or 2, which further comprises an underlayer consisting of a chromium-based alloy between the seed layer and the magnetic recording layer.

7. A magnetic recording medium comprising a nonmagnetic substrate having applied thereon a magnetic recording layer, in which said substrate has, on an upper surface thereof, in sequence, a crystal orientation-improving layer and a seed layer consisting of a material having a higher surface energy than that of the crystal orientation-improving layer, and said seed layer has a thickness of not more than 2 nm, when the thickness is determined assuming that the seed layer has a continuous thickness;

wherein said magnetic recording layer is constituted from a five-component metal alloy of cobalt, chromium, platinum, tantalum and niobium which is represented by the following formula:

in which bal. means a balance amount, and a sum of x and y (x+y) is in the range of 1 to 5 at %.

8. The magnetic recording medium according to claim 1 or 2, which further comprises, applied over said magnetic recording layer, a protective layer consisting of carbon or diamondlike carbon.

9. A magnetic recording medium according to claim 1 or 2, which is in the form of a disk.

10. A magnetic recording device comprises a recording head section for recording in a magnetic recording medium and a reproducing head section for reproducing information, in which the magnetic recording medium comprises a nonmagnetic substrate having applied thereon a magnetic recording layer, in which said substrate has on a upper surface thereof, in sequence, a crystal orientation-improving layer and a seed layer consisting of a material having a higher surface energy than that of the crystal orientation-improving layer, said seed layer having a thickness of not more than 2 nm, when the thickness is determined assuming that the seed layer has a continuous thickness; and said recording head section is provided with a magnetoresistive head;

wherein said magnetic recording layer is constituted from a four-component metal alloy of cobalt, chromium, platinum and tantalum which is represented by the following formula:

$$Co_{bal.}-Cr_{14-22}-Pt_{4-10}-Ta_x$$

in which bal. means a balance amount, and x is in the range of 1 to 5 at %.

11. A magnetic recording device according to claim 10, in which said nonmagnetic substrate is a substrate of an aluminum-based alloy or a glass substrate.

12. The magnetic recording device according to claim 10 or 11, in which said magnetoresistive head is a MR head, an AMR head or a GMR head.

13. A magnetic recording device comprises a recording head section for recording in a magnetic recording medium and a reproducing head section for reproducing information, in which the magnetic recording medium comprises a nonmagnetic substrate having applied thereon a magnetic recording layer, in which said substrate has on a upper surface thereof, in sequence, a crystal orientation-improving layer and a seed layer consisting of a material having a higher surface energy than that of the crystal orientation-improving layer, said seed layer having a thickness of not more than 2 nm, when the thickness is determined assuming that the seed layer has a continuous thickness; and said recording head section is provided with a magnetoresistive head;

wherein said magnetic recording layer is constituted from a five-component metal alloy of cobalt, chromium, platinum, tantalum and niobium which is represented by the following formula:

$$Co_{bal.}-Cr_{14-22}-Pt_{4-10}-Ta_x-Ta_x-Nb_y$$

in which bal. means a balance amount, and a sum of x and y (x+y) is in the range of 1 to 5 at %.

14. A magnetic recording medium according to claim 7, in which said nonmagnetic substrate is a substrate of an aluminum-based alloy or a glass substrate.

15. A magnetic recording medium according to claim 7 or 14, in which said seed layer is an island-like film consisting of an islandwise distributed and deposited material having a higher surface energy than that of the crystal orientation-improving layer.

16. A magnetic recording medium according to claim 7 or 14, in which said crystal orientation-improving layer comprises NiP or CrP.

17. A magnetic recording medium according to claim 7 or 14, which further comprises an underlayer consisting of a chromium-based alloy between the seed layer and the magnetic recording layer.

18. The magnetic recording medium according to claim 7 or 14, which further comprises, applied over said magnetic recording layer, a protective layer consisting of carbon or diamondlike carbon.

19. A magnetic recording medium according to claim 7 or 14, which is in the form of a disk.

* * * * *